Patented Dec. 26, 1922.

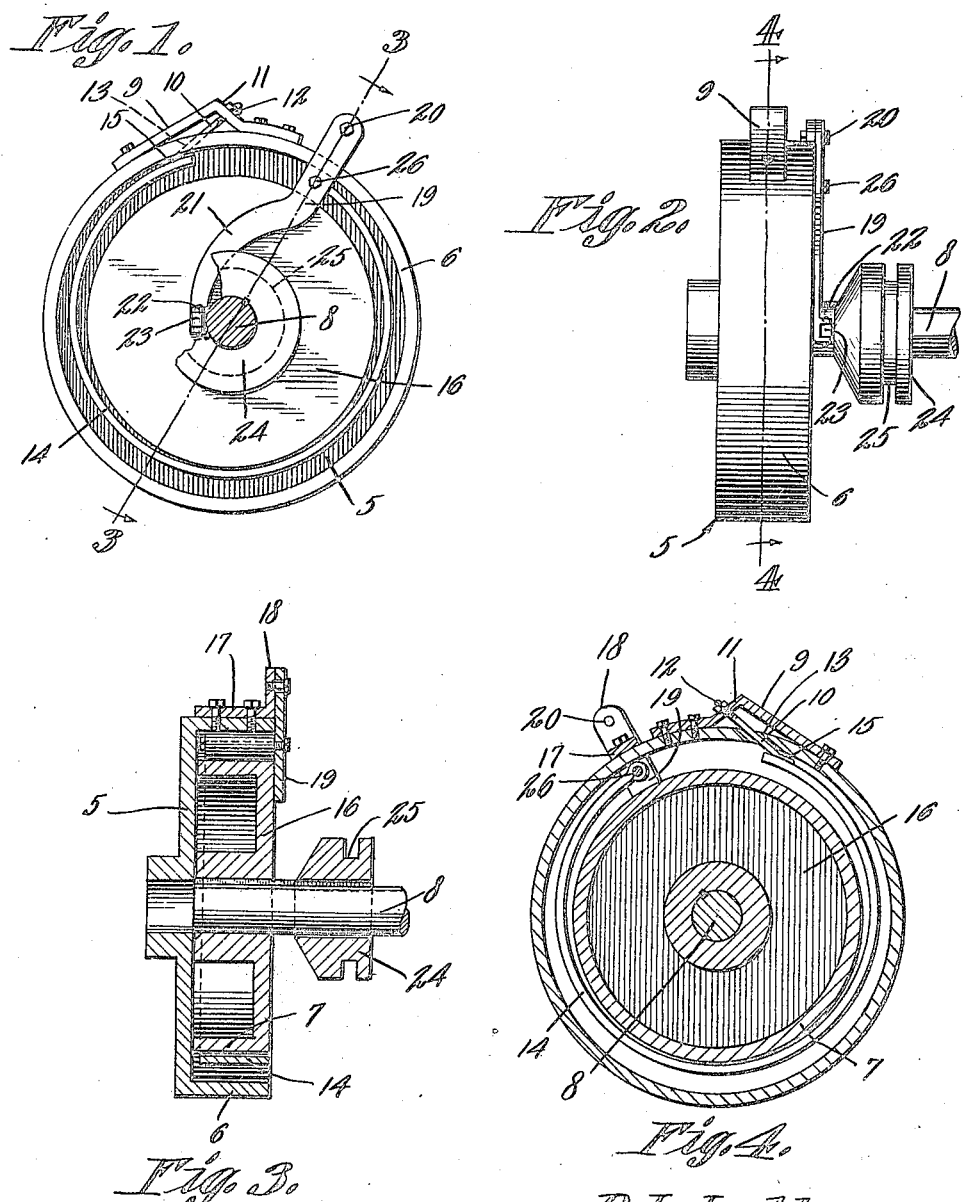

1,440,226

UNITED STATES PATENT OFFICE.

DANIEL L. LOTT, OF TIFFIN, OHIO, ASSIGNOR TO THE LOOMIS MACHINE COMPANY, OF TIFFIN, OHIO.

FRICTION CLUTCH.

Application filed January 14, 1922. Serial No. 529,206.

*To all whom it may concern:*

Be it known that I, DANIEL L. LOTT, a citizen of the United States, residing at Tiffin, in the county of Seneca and State of Ohio, have invented a new and useful Friction Clutch, of which the following is a specification.

This invention has reference to clutch constructions, and more particularly clutch constructions of the friction band type.

The primary object of the invention is to provide a clutch of this character which may be readily and easily adjusted, while the clutch is in operation, thereby eliminating the necessity of stopping the machine or driving member to make the adjustment.

Another object of the invention is to provide novel means for operating the friction band forming a part of the clutch.
With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a clutch mechanism constructed in accordance with the present invention.
Figure 2 is a front elevational view of the same.

Figure 3 is a sectional view taken on line 3—3 of Figure 1.

Figure 4 is a sectional view taken on line 4—4 of Figure 2.

Referring to the drawing in detail, the reference character 5 designates the driven head of the clutch, which driven head may be mounted to rotate at one end of a driven shaft, not shown.

Forming a part of the driven head 5 is the rim 6 which extends laterally therefrom, and is disposed adjacent to the periphery of the driven head, as clearly shown by Figure 3 of the drawing.

The driven head is of a construction to house the rim 7 of the driving or inner section of the clutch, the driving member being keyed to the drive shaft 8, which may have connection with a suitable source of power not shown.

Secured to the outer surface of the rim 6 of the driven head, is a bracket member 9, which is disposed at an angle with respect to the rim, and is formed with an opening to accommodate the bolt 10, the threaded portion 11 thereof accommodating the nut 12 by means of which the bolt may be adjusted with respect to the rim 6 of the driven head. The bolt 10 also extends through the opening 13 formed angularly through the rim 6, which bolt has connection with one end of the clutch band 14, as at 15, to anchor one end of the clutch band to the rim of the driven head.

As shown, this clutch band surrounds the rim 7 of the driving section 16 and is of a diameter to normally lie in spaced relation with the rim 7, to permit of rotary movement of the driving section, with respect to the driven head.

Secured to the rim 6 of the driven head is a bracket 17 which has a flange 18 providing a support for the arm 19 which has pivotal connection with the flange 18 as through the bolt 20. This arm 19 is formed with a curved portion 21 which terminates at a point adjacent to the shaft 8, and is formed with laterally extending bearing members 22 that support the roller 23 which contacts with the cone operating member 24.

The member 24 is splined on the shaft 8, as clearly shown by Figure 3 of the drawing, and is formed with a groove 25 to accommodate the usual clutch operating lever not shown.

The arm 21 provides a support for one end of the clutch band 14, as shown at 26, so that when the clutch is operated, and the arm 21 moved laterally, the band 14 will be moved into close engagement with the driving section 16, to connect the driven head 5 and driving member 16.

Having thus described the invention, what is claimed as new is:—

In a clutch mechanism, a driven head having a laterally extending rim, a bracket member secured to the rim, a band, a bolt having connection with the band and extending through the rim, said bolt extending through the bracket member, a nut operating on the bolt to adjust one end of the band, a pivoted arm supporting the opposite end of the band, a driving section operating within the rim, and means for moving the arm to bring the band into close engagement with the driving section to cause the driven head and driving section to move in unison.

In testimony that I claim the foregoing as my own, I have hereto affixed my signature in the presence of two witnesses.

DANIEL L. LOTT.

Witnesses:
C. H. RUNYAN,
F. HANNEMAN.